(12) United States Patent
Qian et al.

(10) Patent No.: US 10,445,657 B2
(45) Date of Patent: *Oct. 15, 2019

(54) GENERAL FRAMEWORK FOR CROSS-VALIDATION OF MACHINE LEARNING ALGORITHMS USING SQL ON DISTRIBUTED SYSTEMS

(71) Applicant: EMC Corporation, Hopkinton, MA (US)

(72) Inventors: Hai Qian, Foster City, CA (US); Rahul Iyer, Foster City, CA (US); Shengwen Yang, Beijing (CN); Caleb E. Welton, Foster City, CA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 980 days.

This patent is subject to a terminal disclaimer.

(21) Appl. No.: 14/963,061

(22) Filed: Dec. 8, 2015

(65) Prior Publication Data

US 2016/0092794 A1    Mar. 31, 2016

Related U.S. Application Data

(63) Continuation of application No. 13/931,879, filed on Jun. 29, 2013, now Pat. No. 9,235,813.

(51) Int. Cl.
*G06N 20/00* (2019.01)
*G06K 9/62* (2006.01)
*G06N 5/02* (2006.01)
*G06N 7/00* (2006.01)

(52) U.S. Cl.
CPC ........... *G06N 20/00* (2019.01); *G06K 9/6256* (2013.01); *G06N 5/025* (2013.01); *G06N 7/005* (2013.01)

(58) Field of Classification Search
CPC ........ G06N 20/00; G06N 5/025; G06N 7/005; G06N 99/005; G06K 9/6256; G06K 9/6269
USPC .......................................................... 706/12
See application file for complete search history.

(56) References Cited

U.S. PATENT DOCUMENTS

| | | | | |
|---|---|---|---|---|
| 7,318,051 B2 * | 1/2008 | Weston | ................ | G06K 9/6215 706/12 |
| 7,827,123 B1 * | 11/2010 | Yagnik | ................... | G06N 20/00 706/12 |
| 2007/0122347 A1 * | 5/2007 | Statnikov | ............... | G16B 40/00 424/9.341 |

* cited by examiner

*Primary Examiner* — Kakali Chaki
*Assistant Examiner* — Ababacar Seck
(74) *Attorney, Agent, or Firm* — Barry N. Young

(57) ABSTRACT

A general framework for cross-validation of any supervised learning algorithm on a distributed database comprises a multi-layer software architecture that implements training, prediction and metric functions in a C++ layer and iterates processing of different subsets of a data set with a plurality of different models in a Python layer. The best model is determined to be the one with the smallest average prediction error across all database segments.

18 Claims, 6 Drawing Sheets

GENERAL FRAMEWORK FOR CROSS-VALIDATION OF MACHINE LEARNING ALGORITHMS USING SQL ON DISTRIBUTED SYSTEMS

CROSS REFERENCE TO OTHER APPLICATIONS

This application is a continuation of co-pending U.S. patent application Ser. No. 13/931,879, entitled GENERAL FRAMEWORK FOR CROSS-VALIDATION OF MACHINE LEARNING filed Jun. 29, 2013 which is incorporated herein by reference for all purposes.

BACKGROUND OF THE INVENTION

This application relates generally to analyzing data using machine learning algorithms to develop prediction models for generalization, and more particularly to cross validation of machine learning algorithms on distributed database systems.

Companies and other enterprises acquire and store large amounts of data and other information relevant to their operations, generally in large distributed databases. Successful companies may acquire, explore, analyze and manipulate the data in order to search for facts and insights that characterize the data and lead to new business opportunities and leverage for their strategies. Analyzing large amounts of data to gain insight into the data so it may be used for generalization and prediction is a complex task.

One approach to characterizing data is to use supervised learning. Supervised learning is a machine-implemented approach to analyzing a set of representative training data to produce an inferred function or model from the data that can be used with a prediction function for generalization or prediction on another set of similar data. The training data is generally a subset of the data set comprising training samples that are analyzed using a computer executing a supervised learning algorithm to produce the inferred function or model. Different models may be used with the training and prediction functions, and a metric function is used to measure the differences between the values predicted by the prediction function using the models and the actual values. The metric function measures the performance of the models. The supervised learning algorithm creates the models for the data using the training samples. The objective is to produce a model that results in the smallest difference between the predicted values and the real values. However, a supervised learning model typically has parameters that cannot be fitted using the training data through this process, and other methods are needed to fix the values of these parameters.

Cross-validation is an approach for assessing how the results of a statistical analysis will generalize to an independent data set. It is useful in prediction applications to estimate how accurately a predictive model will perform in practice. Cross-validation comprises partitioning a sample of data into complementary subsets, performing an analysis on one subset (called the training set), and validating the analysis on the other subset (called the validation set). To reduce variability, multiple rounds of cross-validation may be performed using different partitions, and the validation results of the multiple rounds averaged.

Supervised learning and cross-validation require processes such as executing training, prediction and metric functions that query languages such as Structural Query Language (SQL) and the like generally cannot perform, and these processes normally cannot run directly within a database. It is desirable to provide systems and methods that afford a framework that operates within a database to execute such functions directly on stored data and produce measurements of model performance for multiple sets of values and for one or more sets of model parameters. It is to these ends that the present invention is directed.

BRIEF DESCRIPTION OF THE DRAWINGS

Various embodiments of the invention are disclosed in the following detailed description and the accompanying drawings.

FIG. 5, comprising

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

This invention is particularly well adapted for use with a large distributed relational database system such as a massively parallel processor (MPP) shared-nothing database system used for data warehousing or transaction processing, and will be described in that context. It will be appreciated, however, that this is illustrative of only one utility of the invention and that the invention has applicability to other types of data storage systems and methods.

Figure 1:
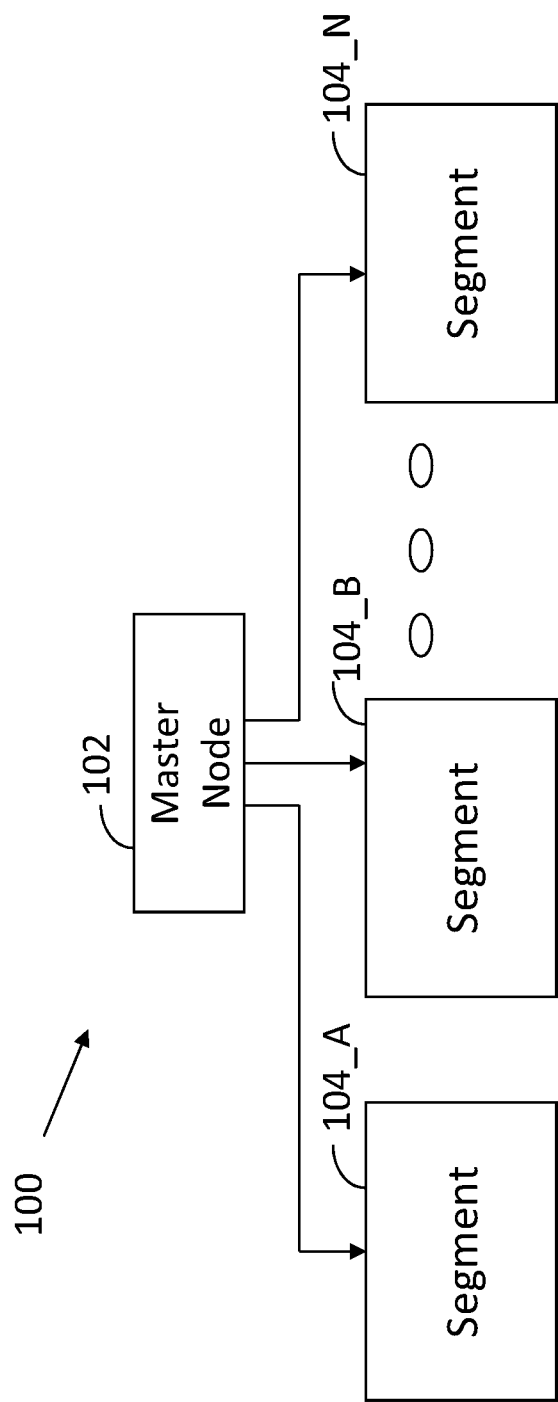
FIG. 1 is a diagrammatic view of the architecture of a distributed database system with which the invention may be used.

FIG. 1 is an overview of the architecture of one type of distributed database system 100 with which the invention may be employed, the database system shown being a massively parallel processor (MPP) shared nothing distributed database system. The database system may include a master node 102 which connects via a network to a plurality of distributed segment nodes 104_A through 104_N. Each segment node may comprise one or more database (DB) instances. The master and segment nodes may comprise generally similar server systems and have similar architectures and process models. Data stored in the database is distributed across the segments. The nodes operate together to process user data requests (queries) and return results, and to perform other user directed processing operations, such as running supervised machine learning algorithms and cross-validation functions, as will be described. The segments 104_1-104_N work together under the direction of the master 102 to process workloads.

Figure 2:
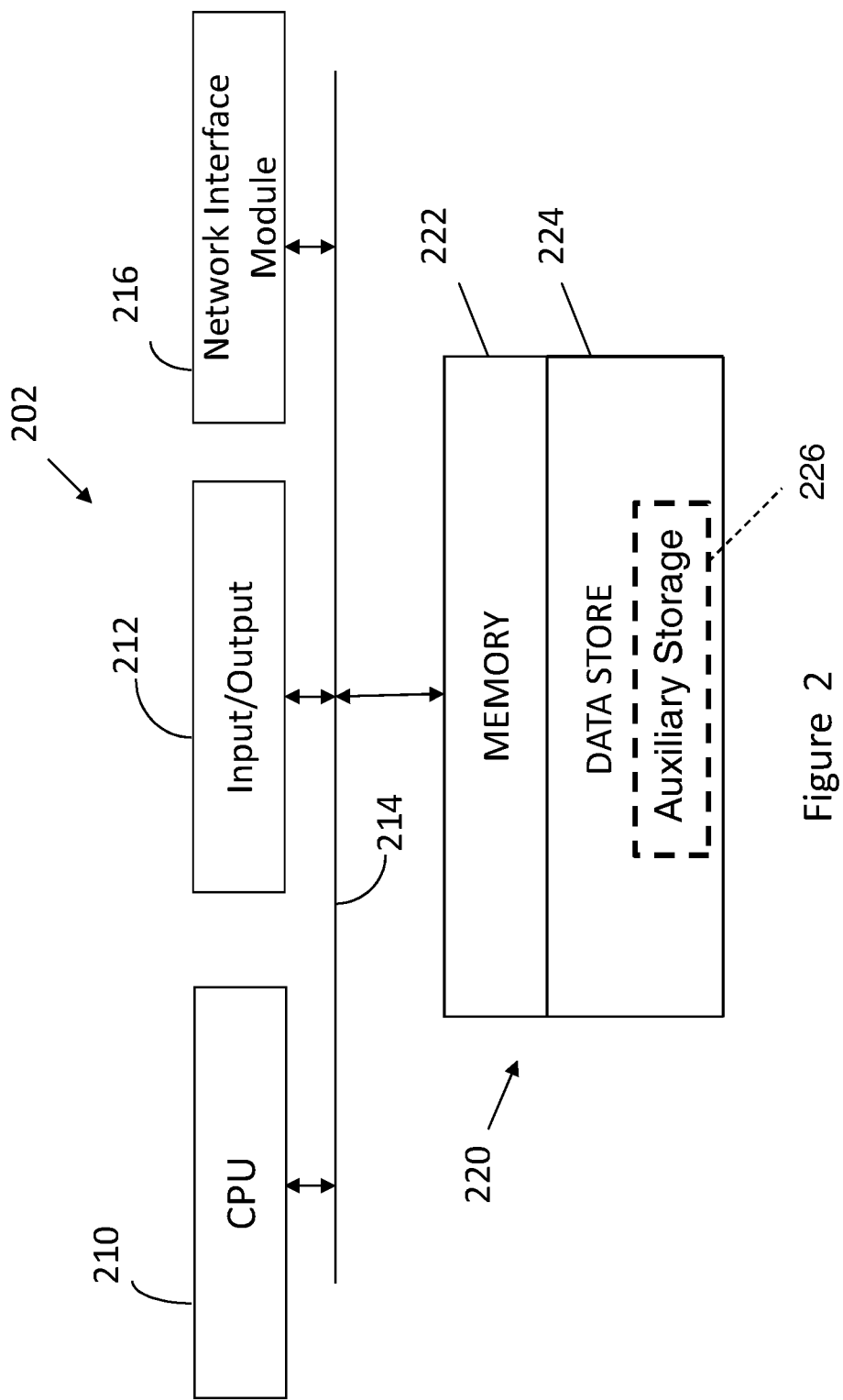
FIG. 2 illustrates a preferred embodiment of a node of the database system of FIG. 1.

FIG. 2 illustrates an example of the architecture of a master node 202 of the database system that is configured to perform processes and operations in accordance with the invention. The master node and the segment nodes may have substantially similar architectures, as stated above. The master node 202 may comprise a host computer server system (which may comprise a single CPU 210 or which may be a multi-processor system comprising a plurality of CPUs) connected to input/output (I/O) devices 212 by a communications bus 214. The I/O devices may be standard computer system input and output devices. A network interface module 216 may also be connected to bus 214 to allow the master node to operate in the networked environment. The master node may further have storage 220 comprising non-transitory physical storage media connected to the bus that embodies executable instructions, such as an operating system and application programs, to control the operations of the computer system. Storage 220 may include a main memory 222 embodying control programs that control the CPU to operate in accordance with the invention, as will be described, and may contain other storage 224 including a data store that stores system configuration information, logs, applications and utilities, data and provides auxiliary storage 226 for storing the results of processing algorithms and functions, as will be described.

The master 202, as will be described in more detail below, may be responsible for accepting queries from a client (user), planning queries, dispatching query plans to the segments for execution on the stored data in the distributed storage, and collecting the query results from the segments. The master may also accept directions from a user or other application programs to perform other processing operations, as will be described. In addition to interfacing the segment hosts to the master host, the network interconnect module 216 may also communicate data, instructions and results between execution processes on the master and segments.

As will be described in more detail below, the invention comprises a general framework for cross-validation of supervised learning algorithms represented as a model training function, a prediction function and a metric function within a distributed database. The framework takes the three functions and produces a measurement of the model performance for multiple sets of values of one or more model parameters to provide one or more models. Cross-validation provides a reliable way to measure the performance of the supervised learning algorithm. In the distributed system, a supervised learning model is executed in parallel on all database segments directly on stored user data as user-defined functions that include the training, prediction and metric functions used as input in the cross-validation framework. A metric value is returned as a measurement of the performance of each of the one or more model. The framework is general so that it is compatible and usable with any supervised learning algorithm, and it is flexible enough to allow cross-validation of parameters of different formats and types. As will be described, the cross-validation framework of the invention is implemented in higher levels of a software architecture that interfaces with the database management system (DBMS) query software and calls the other functions without changing lower level details of the supervised learning models.

An overview of the invention will first be described with reference to FIG. 3 before describing the details of a preferred embodiment of the invention in FIG. 5. Generally, the invention comprises performing a training process preferably using a variety of different models on part of a given data set, predicting a result using the models on another part of the data set, and selecting the best model to use for generalization and prediction. The best model is the one that has the smallest prediction error. Selecting the best model is best formed by cross validation. As stated above the supervised machine learning model comprises a training function, a prediction function and a metric function. The training function is used to find the best parameter set for a model that minimizes a particular target function for the model. The prediction function receives as inputs different variable values and predicts corresponding target values, and the metric function measures the difference between a known target value and a predicted value. Cross validation involves partitioning a sample of data into complementary subsets, performing analysis on one subset referred to as a training set, and validating the analysis on the other set called the validation set.

Figure 3:
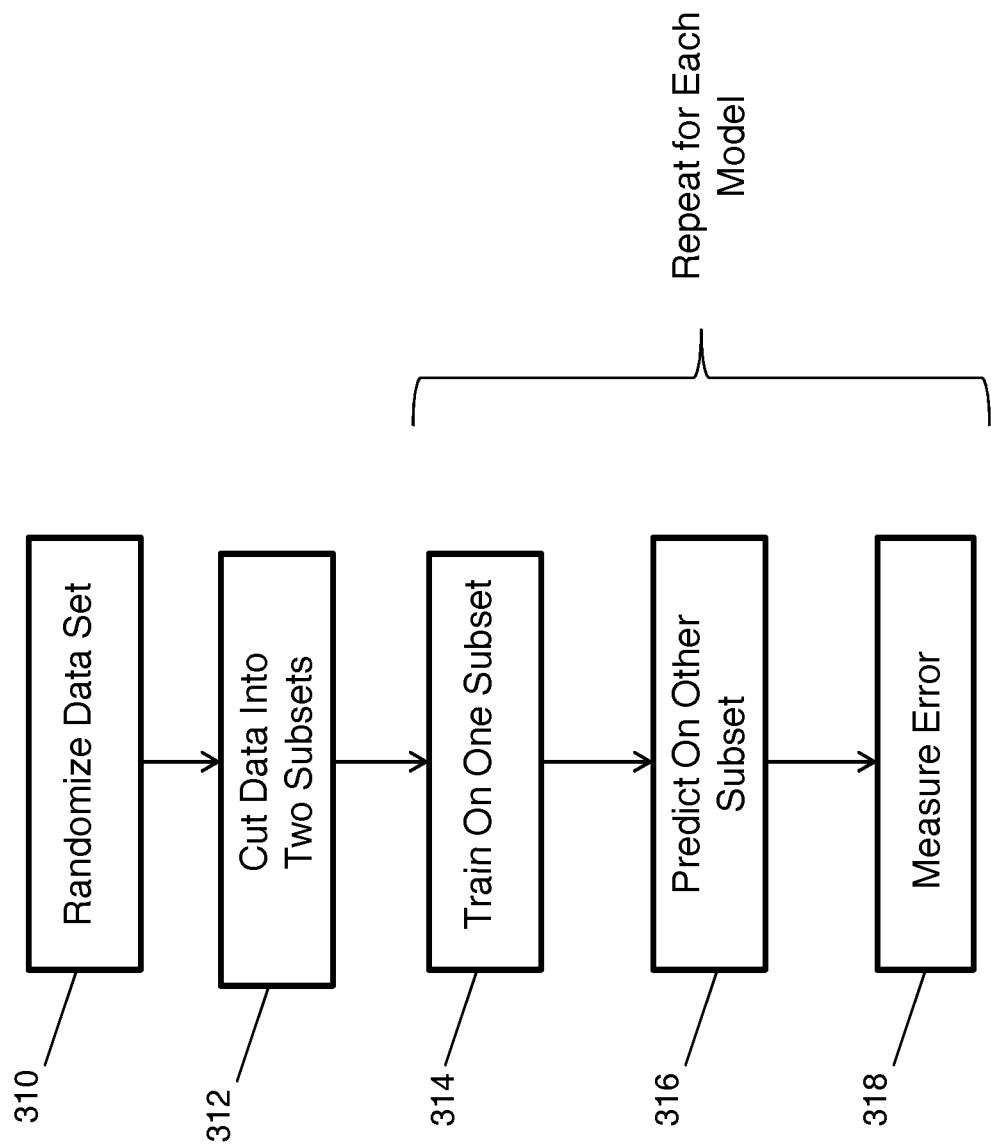
FIG. 3 is a diagrammatic view that illustrates generally a cross-validation process in accordance with the invention.

Referring to FIG. 3, in accordance with the invention, at 310 a selected set of data in the database is copied into a new table and randomized. At 312, the randomized data is partitioned (cut) into two subsets. Randomization helps to insure that the two data subsets are independent and statistically equivalent. Rather than partitioning the data set into k equal sized parts, as is typically done for conventional k-fold cross-validation for statistical analysis, the invention preferably partitions the data set into two subsets that are of different sizes, runs cross-validation on the two subsets, and iterates the partitioning and cross-validation using different partitions of the data set. The larger one of the partitioned subsets is used for training purposes and is referred to as a training subset, and the smaller subset is used for validation of a prediction function and measurement of the error in the results. This subset is referred to as the validation set. At 314, the process trains on the training set (the largest set) using a first set of parameters to define a model for the target function. At 316, the process uses the parameters found using the training function in a prediction function operating on the smaller validation subset to predict a value of a data element. At 318, a metric function measures the error between the predicted value and the actual value of the data element in the validation subset. In order to measure the effectiveness of different models, steps 314-318 may be iterated for the different models by varying one or more of the parameters of the functions to define the different models and use the measured errors to determine the best model.

As an example, for a given data set comprising data elements $(x_i, y_i)$, where $i=1, \ldots, N$, the training function finds coefficients a, b, that minimize a target function. An exemplary target function is:

$$\min_{a,b} \sum_{i=1}^{N} (y_i - a - bx_i)^2 + \lambda |b|$$

Here, the parameter $\lambda$ may be a predetermined fixed value. Different $\lambda$ values correspond to different models. Furthermore, before training the model, the value of parameter $\lambda$ must be fixed. Every value of $\lambda$ represents a different model that affords different results. An example of a prediction function is:

$$\hat{y} = a + bx$$

Given a new data set, and an independent variable x value, this prediction function predicts a dependent variable y value. A representative metric function that measures the difference between a predicted value $y_k$ and the real value in the dataset is:

$$\frac{1}{N} \sum_{k=1}^{M} (y_k - a - bx_k)^2$$

The above functions are only representative examples of target, prediction and metric functions. As may be appreciated, any supervised machine learning functions, including more complex functions having more complex parameter sets, may be used in the process. By measuring the quality of each model, the invention enables the best model to be selected. As will also be appreciated, parameters may have different formats, e.g., a number, a pair of numbers, a string, etc.

Since the generalized process shown in FIG. 3 uses one part of the data for training and another part for validation, the result is subject to inaccuracies. To address this problem, as will be described, the invention preferably iteratively partitions the data into k different subsets, runs the cross-validation process on the different subsets, and determines the metric value for each. The metric values are averaged and the best average value is selected.

For a k-fold cross-validation process, a data set needs to be partitioned (cut) into k equal pieces. However, the data in a distributed database has no specific order, and, thus, cannot be easily cut. As will be described, a cross-validation process in accordance with the invention attaches order to the data in the database, and successively cuts the ordered data into k pieces, performs a cross-validation process on each cut for a plurality of models, and averages the results to determine the best model.

Figure 4:
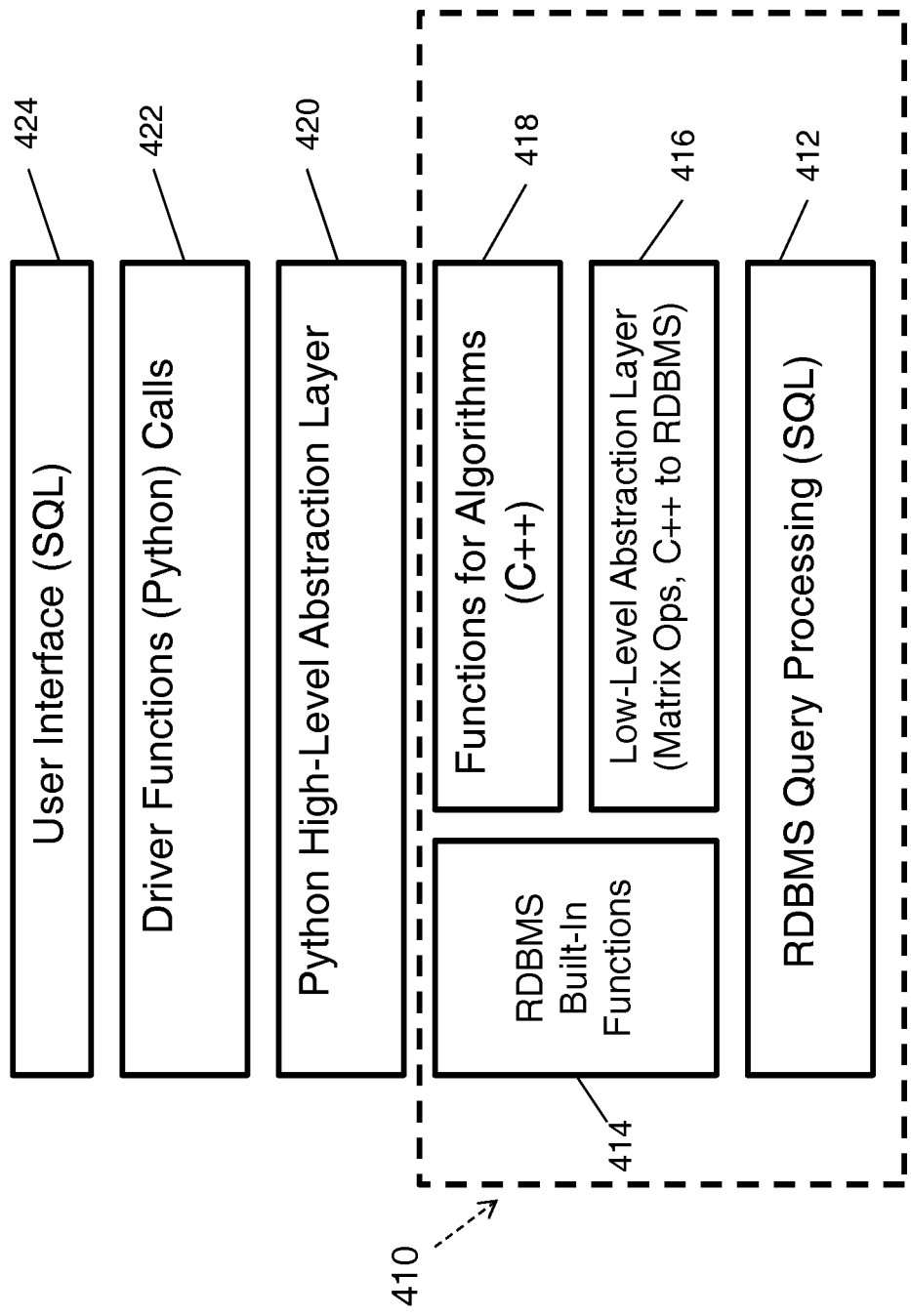
FIG. 4 is a diagrammatic view illustrating a preferred embodiment of the architecture of a system in accordance with the invention.

As previously indicated, SQL cannot itself handle supervised machine learning algorithms such as illustrated above, nor can SQL easily handle the overall processes described iteratively. Thus, implementing supervised machine learning and cross-validation processes in a database system is challenging. The invention addresses this challenge by providing a novel architecture that integrates software abstraction layers that implement supervised machine learning and cross-validation functions with SQL and other RDBMS functions. FIG. 4 illustrates this architecture.

FIG. 4 is a diagrammatic view of the architecture of a database system that is enhanced in accordance with the invention to perform supervised machine learning and cross-validation processing. As shown in figure, the database system may comprise a generally known SQL data store 410 comprising relational database management system (RDBMS) query processing 412, for example, conventional PostgresSQL, and RDBMS built-in functions 414. The system may include on top of the conventional SQL layer 412 two or more processing layers written in a programming language such as C++ that interface with the database SQL. These processing layers may include a low level abstraction layer 416 that may provide matrix operations and a C++ to RDBMS bridge, and a layer 418 that incorporates functions for algorithms for various supervised machine learning and cross-validation processes. The functions are preferably written in C++, which allows them to be easily updated and supplemented as needed. SQL may call the C++ functions within layers 416 and 418 to execute operations on the stored data in the database. The database system may further include a high-level abstraction layer 420 and a driver function layer 422 on top of the C++ layers. The high-level abstraction layer 420 may include a grouping controller that calculates the partitions for the data cut and groups the data, and an iteration controller that controls the iterations of the cross-validation functions as well as other functions as will be described in connection with FIG. 5. The driver function layer 422 may include SQL calls to the grouping controller in layer 420 for executing the loops of iterative algorithms (as will be described in connection with FIG. 5). Layers 420 and 422 are preferably written in a programming language such as Python. Finally, a SQL user interface layer 424 may be included over the Python layers. The SQL user interface enables a user to control the operation of the database system using SQL commands. It calls the other functions without changing the lower level details of the supervised learning models. The cross-validation framework of the invention is realized primarily on the higher level layers of the software architecture. The interactions between these layers will become evident in the description of the process of FIG. 5.

Figure 5A:
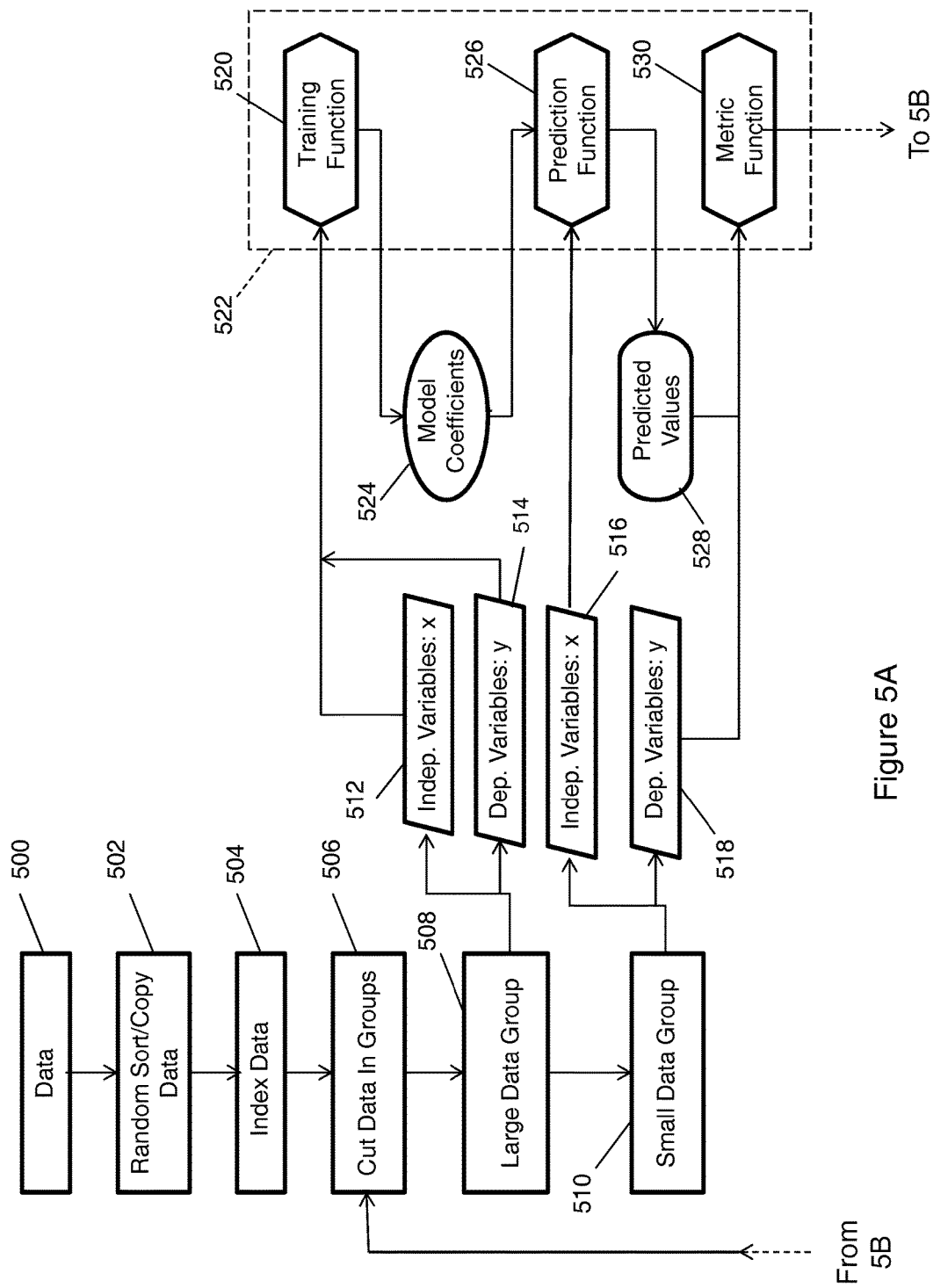
FIGS. 5A and 5B, is more detailed diagrammatic view of a cross-validation process for a distributed database in accordance with a preferred embodiment of the invention.
Figure 5B:
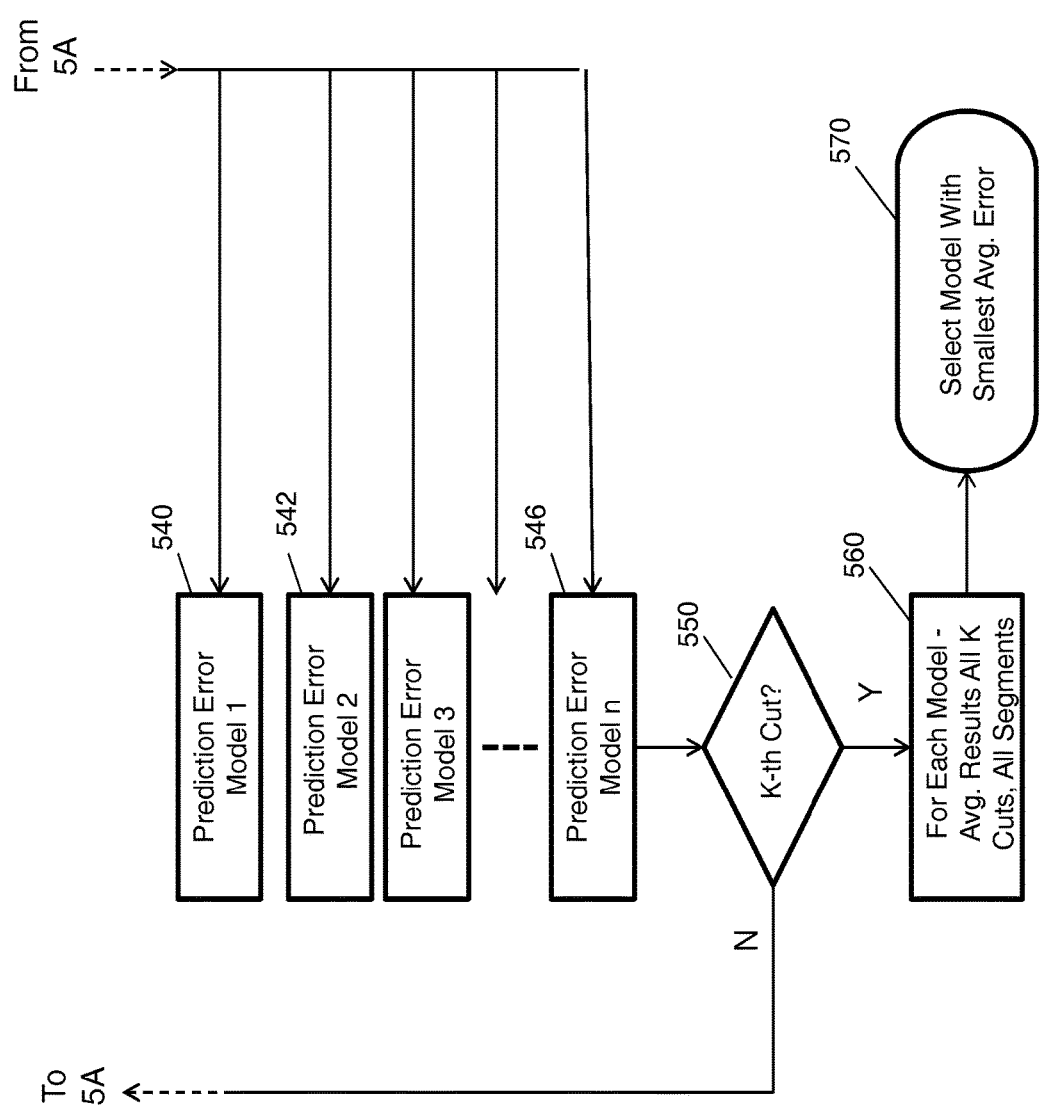

FIG. 5, comprising FIGS. 5A and 5B, illustrates a cross-validation process in accordance with the invention on a distributed database system. The cross validation process is performed on all segments of the distributed database, preferably in parallel.

Referring to the figures, for a selected data set 500, e.g., 1000 rows of table data, the data is randomly sorted and copied at 502 to a new table in the database using conventional SQL processes which may be called by the Python layer 422. At 504, a SQL command may be used to attach an identifying index to each row of copied data in the new table. This may be part of the random sorting and copying process 502. Next, at 506, the randomized and sorted data that was copied into the new table may be partitioned into two groups, a large group 508 and a small group 510. The large group may be the training set, and the small group they be the validation set. The partitioning may be done by the Python layer software which may calculate and select using the row indices a predetermined number of rows of the randomly sorted data, e.g., ten rows (1-10) of data, as the smaller validation set, and retain the remaining rows (e.g., 11-1000) of data, as the larger training set. Python may pass the indices for the rows of data for the two groups to SQL which actually does the partitioning.

Next, independent variables, x, of each row of the large training group 508 may be identified at 512, and the corresponding dependent variables, y, of each row may be identified at 514. These independent variables and dependent variables may be supplied to a training function 520 of a group 522 of supervised learning models. Training function 520 may be implemented in C++ by layer 418. The training function processes the independent and dependent variables to determine at 524 the coefficients for a particular model, e.g., "Model 1", corresponding to a particular λ parameter value, and supplies the coefficients to a prediction function 526 of group of the supervised learning models 522. The prediction function 526 may also be implemented in C++ in layer 418.

Similarly, independent variables, x, of each row of the small validation group 510 may be identified at 516, and the corresponding dependent variables, y, of each row of small group may be identified at 518. The independent variables, x, 516 may be supplied to the prediction function 526, which may use the independent variables, x, and the model coefficients 524 to calculate at 528 predicted y values corresponding to the x values. The predicted y values 528 and the corresponding real dependent variables y 518 of the validation group may be supplied to a metric function 530 of the supervised learning model group 522. The metric function 530, like the other supervised learning models 520 and 526, may be implemented in C++. The metric function 530 measures the difference between the predicted value of y 528 provided by the prediction function 526 using the particular model, e.g., "Model 1" and the real value of y 518 from the validation set, and may record at 540 the prediction error of Model 1 in a table or matrix, for example, in the database.

Next, a new value for parameter λ may be selected for a next model, i.e., "Model 2", and process steps 520, 524, 526, 528 and 530 repeated on the same large and small data groups 508, 510 to determine a prediction error for Model 2. The prediction error for Model 2 may similarly be stored at 542 in the table in the database. This may be repeated for a plurality, n, of different λ parameter values for n different models to determine and store corresponding prediction errors for the n models. The prediction error for "Model n" may be stored at 546 in the table or matrix.

Upon completion of the foregoing process steps for the first data cut, k=1, a counter of decision step 550 determines that all k cuts have not been made, and the process loops back to step 506. The next data cut is made to define new training and validation groups 508, 510, respectively, and the process steps 512-550 are iterated on these groups for each of the remaining n models. After the process has been performed for all k cuts, at 560 the average results for each model for all k cuts and from each database segment may be determined. At 570, the model with the smallest average error may be selected as the best and provided to the user.

Different training functions, prediction functions and metric functions of a supervised learning model can have very different interfaces. The invention affords a general framework for cross-validation that is able to accommodate different interfaces of the various supervised learning models. The general framework of the invention may have only a minimum requirement for the interfaces of supervised learning models to permit their use. The training function may have the form "f(%data%, . . . )" where "%data%" may be replaced by Python with an actual data name inside the cross-validation function. SQL may call the training function "f" using a string created by Python. The prediction function may have the form "g(%model%, %data%, . . . )", where "g" is the prediction function name supplied as a string by Python, and "%model%" is a string for the model coefficients and parameters. The metric function similarly may have the form "h(%pred%, %data%, . . . ), where "h" is the metric function name and "%pred%" is replaced by the predicted data value. All of the quantities delineated by "%" are dynamically replaced inside the cross-validation functions by appropriate values. A list of the argument names and types for the training, prediction and metric functions are passed to the cross-validation function. The parameters may also have any format or be of any type. The cross-validation framework accepts a string as the parameter for cross-validating. The string can be converted to any data format and type.

While the foregoing has been with respect to preferred embodiments of the invention, it will be appreciated that changes to these embodiments may be made without departing from the principles and spirit of the invention, the scope of which is defined in the appended claims.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of cross-validation of a supervised machine learning algorithm within a distributed database having a plurality of database segments in which data are stored, comprising:
   partitioning a data set within said database into a training subset and a validation subset, wherein the partitioning data set comprises partitioning the data set according to randomly sorted data to create two data subsets that are independent and statistically equivalent;
   determining coefficients of a first model of said supervised machine learning algorithm using the training subset;
   predicting a value of a data element in said validation subset using said first model;
   determining a prediction error based at least in part on a difference between said predicted value and the actual value of said data element;
   successively repeating said partitioning k times to form k different partitions, wherein at least a subset of the k different partitions have different training and validation subsets;
   determining corresponding k prediction errors based at least in part on iteratively determining the coefficients, predicting the value of the data element, and determining the prediction error for each of said k partitions;
   evaluating the performance of said first model using said k prediction errors; and
   wherein said supervised learning algorithm comprises a target function, a prediction function, and a metric function, the target function establishing coefficient values that are used by said prediction and said metric functions, and wherein said functions are embodied in application programs in a first application program layer within said database, said functions being called by cross-validation functions in a second application layer within said database system.

2. The method of claim 1, further comprising repeating said method for each of a plurality of other different models, and identifying as the best model the model having the smallest corresponding prediction error.

3. The method of claim 2, wherein each of said models is defined by a parameter set of one or more parameters, and wherein the method further comprises providing in the database a plurality of such parameter sets for establishing said plurality of models.

4. The method of claim 2, further comprising performing said method in parallel on each of said database segments, and wherein said identifying comprises identifying the best model using the results of the k partitions on all segments.

5. The method of claim 1, wherein said partitioning comprises partitioning said data set into a small subset and a large subset, said large subset comprising said training subset, and said small subset comprising said validation subset.

6. The method of claim 1, wherein said determining coefficients comprises using said training subset to select coefficients of said first model that minimize a target function of said supervised machine learning algorithm.

7. The method of claim 1, wherein said predicting comprises predicting said value of said data element using a prediction function of said supervised machine learning algorithm, the coefficients of said first model comprising coefficients of said prediction function.

8. The method of claim 1, wherein said data set comprises table data, and said partitioning comprises running database SQL processing operations to randomly sort said table data set into sorted table data, to attach an index each row of said sorted table data, and to separate using the indices said sorted table data into said training and said validation subsets.

9. The method of claim 1, wherein said functions in said first application layer have formats which define arguments and parameters of the functions using generic elements, and wherein said cross validation functions dynamically replace said generic elements with particular elements.

10. A computer program product comprising a non-transitory computer readable medium storing executable instructions for controlling the operation of a computer in a distributed database having a plurality of database segments to perform a method of cross-validation of a supervised machine learning algorithm, the method comprising:
partitioning a data set within said database into a training subset and a validation subset, wherein the partitioning data set comprises partitioning the data set according to randomly sorted data to create two data subsets that are independent and statistically equivalent;
determining coefficients of a first model of said supervised machine learning algorithm using the training subset;
predicting a value of a data element in said validation subset using said first model;
determining a prediction error based at least in part on a difference between said predicted value and the actual value of said data element;
wherein at least a subset of the k different partitions have partition having different training and validation subsets;
determining corresponding k prediction errors based at least in part on iteratively determining the coefficients, predicting the value of the data element, and determining the prediction error for each of said k partitions; and
evaluating the performance of said first model using said k prediction errors; and
wherein said supervised learning algorithm comprises a target function, a prediction function, and a metric function, the target function establishing coefficient values that are used by said prediction and said metric functions, and wherein said functions are embodied in application programs in a first application program layer within said database, said functions being called by cross-validation functions in a second application layer within said database system.

11. The computer program product of claim 10, further comprising instructions for repeating said method for each of a plurality of other different models, and identifying as the best model the model having the smallest corresponding prediction error.

12. The computer program product of claim 11, wherein each of said models is defined by a parameter set of one or more parameters, and wherein the method further comprises providing in the database a plurality of such parameter sets for establishing said plurality of models.

13. The computer program product of claim 10 further comprising performing said method in parallel on each of said database segments, and wherein said identifying comprises identifying the best model using the results of the k partitions on all segments.

14. The computer program product of claim 10, wherein said partitioning comprises partitioning said data set into a small subset and a large subset, said large subset comprising said training subset, and said small subset comprising said validation subset.

15. The computer program product of claim 10, wherein said determining coefficients comprises using said training subset to select coefficients of said first model that minimize a target function of said supervised machine learning algorithm.

16. The computer program product of claim 10, wherein said predicting comprises predicting said value of said data element using a prediction function of said supervised machine learning algorithm, the coefficients of said first model comprising coefficients of said prediction function.

17. The computer program product of claim 10, wherein said data set comprises table data, and said partitioning comprises running database SQL processing operations to randomly sort said table data set into sorted table data, to attach an index each row of said sorted table data, and to separate using the indices said sorted table data into said training and said validation subsets.

18. The computer program product of claim 10, wherein said functions in said first application layer have formats which define arguments and parameters of the functions using generic elements, and wherein said cross validation functions dynamically replace said generic elements with particular elements.

* * * * *